(No Model.) 2 Sheets—Sheet 1.

R. M. PANCOAST.
EXHAUST COWL.

No. 445,819. Patented Feb. 3, 1891.

Witnesses:
A. V. Groupe.
Hamilton D. Turner

Inventor:
Richard M. Pancoast
by his Attorneys
Howson & Howson

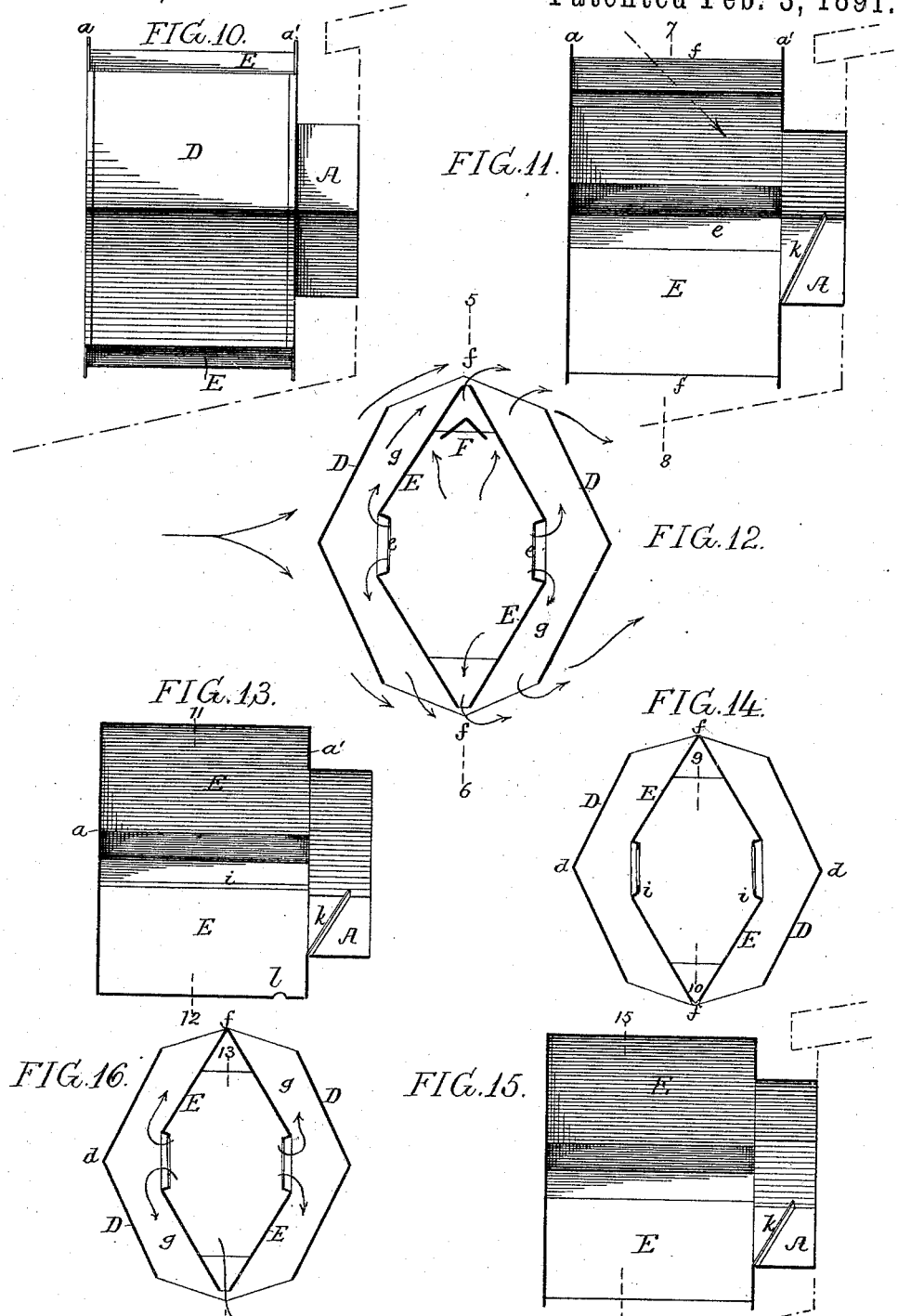

UNITED STATES PATENT OFFICE.

RICHARD M. PANCOAST, OF CAMDEN, NEW JERSEY.

EXHAUST-COWL.

SPECIFICATION forming part of Letters Patent No. 445,819, dated February 3, 1891.

Application filed April 21, 1890. Serial No. 348,812. (No model.)

*To all whom it may concern:*

Be it known that I, RICHARD M. PANCOAST, a citizen of the United States, and a resident of Camden, New Jersey, have invented certain Improvements in Exhaust-Cowls, of which the following is a specification.

The object of my invention is to construct an exhaust-ventilator especially applicable for use on railway-cars and boats, both passenger and freight; but it can also be used to advantage on chimney or exhaust stacks of buildings as well.

Figure 1:
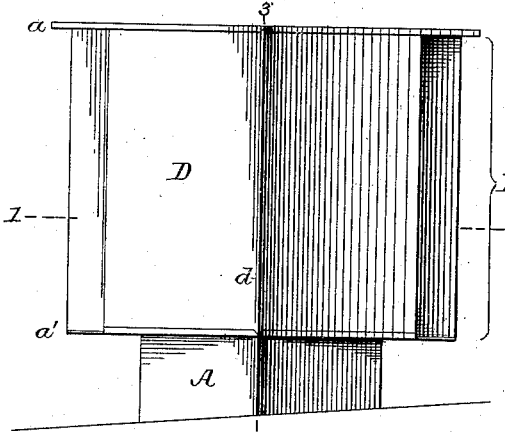
Figure 2:
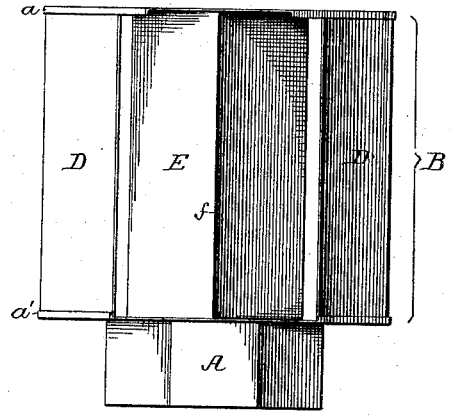
Figure 5:
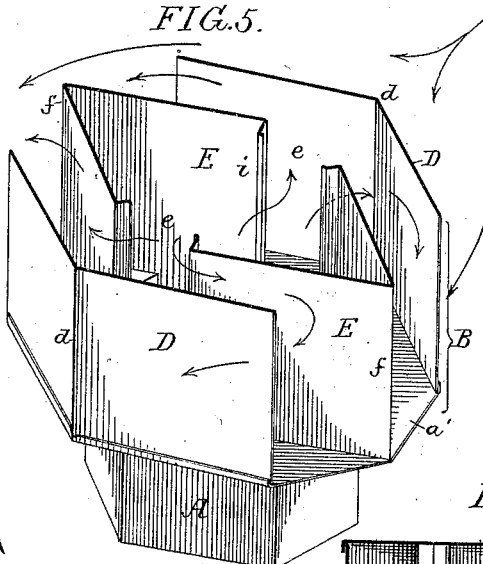
Figure 3:
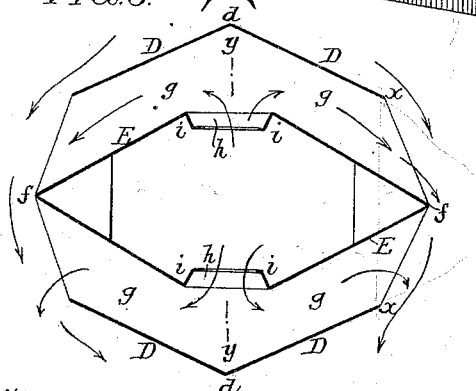
Figure 4:
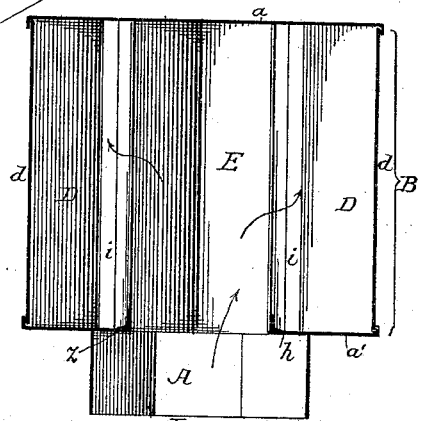
Figure 8:
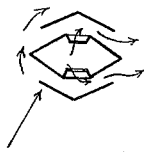
Figure 9:
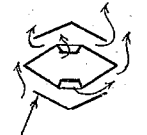

Referring to the accompanying drawings, Figure 1 is a front view of my improved exhaust-ventilator. Fig. 2 is a side view. Fig. 3 is a sectional plan on the line 1 2, Fig. 1. Fig. 4 is a sectional elevation on the line 3 4, Fig. 1. Fig. 5 is a sectional perspective view on the line 1 2, Fig. 1. Figs. 6, 7, 8, and 9 are diagrams illustrating the action of the ventilator. Fig. 10 is a face view showing my improved ventilator adapted to the clear space of a passenger-car. Fig. 11 is a sectional elevation on the line 5 6 of a modification of my invention. Fig. 12 is a section on the line 7 8, Fig. 11. Fig. 13 is a sectional view on the line 9 10, Fig. 14, illustrating a further modification of my invention. Fig. 14 is a transverse section on the line 11 12, Fig. 13. Fig. 15 is a sectional view on the line 13 14, Fig. 16, showing still another modification of my invention; and Fig. 16 is a transverse section on the line 15 16, Fig. 15.

I will refer in the first instance to Figs. 1, 2, 3, 4, and 5, in which is illustrated the exhaust-ventilator in the preferred form, and is shown in Fig. 1 as mounted on the roof of a freight-car, exhausting the foul air from the interior of the same; but it will be understood that the exhaust-ventilator can be mounted on a chimney or other stationary object, or can be placed at the side of a car or on the clear space of a passenger-coach, as clearly shown in Fig. 10, without departing from my invention.

A is the neck or stack, which is secured in any manner to the roof of the car, and mounted on this neck is the cowl B, having top and bottom plates $a\ a'$. Mounted between these two plates are two sets of plates D E, the plates E forming a hood diamond-shaped in cross-section, having vertical openings $e\ e$ at the sides, as shown, to allow for the escape of foul air or smoke from the stack or flue.

The plates D D are mounted outside of the plates E, and are at a slightly-different angle, the plates being bent at a vertical line at $d$ and terminate at a point $x$ back of the line of the point $f$ of the plates E, thus forming a space $g\ g$ between the plates D and E for the passage of foul air or smoke from the stack or chimney, at the same time allowing free passage of air through the cowl.

It will be seen by referring to Figs. 3 to 5 that the plates D completely protect the openings $e\ e$, and as the outside air strikes the cowl, as indicated by the arrows in Fig. 3, it will pass around the end of the cowl, as shown, and tend to suck the foul air or smoke from the interior of the cowl through the passages $e$ and $g$.

Figure 6:
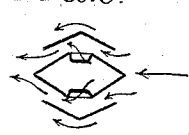
Figure 7:
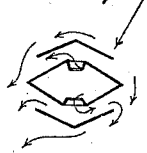

In the event of a heavy blow with rain coming in the direction indicated by the arrows, Fig. 6, the air will pass through the channels $g\ g$, between the plates D and E, forming a draft through the cowl, as indicated by arrows, and to prevent the accidental inlet of rain-water to the interior of the cowl I provide vertical flanges $i\ i$ at the sides of the openings $e\ e$, which project inward from the plates E E. These flanges are ribbed at the end, and at the bottom of the cowl are plates $h\ h$, which project inward from the bottom plate A', and are flanged, as clearly shown in Figs. 3 and 4, the plates carrying away the drip from the flanges $i\ i$, preventing water or dust from gaining access to the interior of the ventilator, which would be blown around the edge of the openings $e$ and would fall into the cowl, but by providing lips $i$ this is entirely prevented. In some instances the passage $g$ is made flaring from the line $y\ y$ outward, so as to allow for the free escape of air.

When the ventilator is mounted on the roof of a car, it is situated with the points $d\ d$ on the longitudinal line of the car, so that the outside air will strike the cowl, as shown in Fig. 3, exhausting the air from the interior of the cowl, also shown by the arrows in Fig. 3, and thus positively preventing the ingress of rain-water, cinders, &c., to the interior of the cowl; but when the cowl is used on stationary objects, such as a chimney or ventilatingstack, it can be mounted in any position, as it matters not in what direction the air strikes it it will exhaust the air from the interior of the cowl, as clearly shown in the diagrams, Figs. 6, 7, 8, and 9. When the cowl is used at the side of a car or to ventilate the clear space of a passenger-car, I prefer to construct it as shown in Figs. 11 and 12, the points *f f* being on a vertical line. The ends of the diamond-shaped cowl formed by the plates E are open, and the deflecting-plate F is placed below the upper opening, so as to prevent the ingress of cinders or rain through said opening into the neck A of the cowl. This would only occur in the event of the rain coming at an angle through the slot, as shown by the dotted arrow in Fig. 11. The rain will be deflected and will fall into the trough-shaped lower portion of the cowl and out through the lower opening. The upper opening is somewhat narrower than the lower opening, and the space between the walls of the cowl and the deflecting-plate is somewhat wider than the upper opening, so that if large cinders should pass through the upper opening they would not clog the other openings, but would readily pass away from the cowl. I also form in the neck A of the cowl inclined deflecting-ribs *k k*, which will throw off any water or cinders that may gain access to the interior of the cowl.

In Fig. 12 I have dispensed with the flanges *i i*.

In Figs. 13 and 14 I have shown another modification of my invention, in which only the lower flanges *i* are used, and the extreme top and bottom portions of the diamond-shaped cowl are closed, with the exception of a small opening *l* in the bottom to allow for the discharge of water or cinders that may gain access to the cowl.

In Figs. 15 and 16 I have shown a long slot in the lower portion of the diamond-shaped cowl, which also acts as an exhaust-opening, as well as an outlet for water.

The height and width of the cowl will vary according to the position in which it is placed, and in some cases the proportion and inclines will vary slightly without departing from my invention.

I claim as my invention—

1. The combination, in an exhaust-cowl, of the diamond-shaped cowl having exits in the front and rear sides with the outer deflecting-casing comprising front and rear plates shielding said exits and extending only to a point back of the line of the points of the diamond cowl-body and inclined so as to form with the diamond-shaped cowl-body opposite inclined discharge-passages, whereby a current of air directed either against the front or rear plates of the cowl is deflected at an angle across both the discharge ends of the cowl by the deflecting-plates, the ends of the cowl-body thus inducing a draft from the center toward the ends through the discharge-passages, substantially as described.

2. The combination of the neck A, plates *a a'*, plates E, forming a diamond-shaped cowl-body having openings *e e*, deflecting-plates D, and flanges projecting inward from the plates E at the openings *e e*, said flanges having projecting ribs or beads at their inner edges, substantially as and for the purpose set forth.

3. The combination, in an exhaust-cowl, of the diamond-shaped cowl-body having its long axis in a vertical plane and having exits at the sides of the body, with plates shielding said exits, said cowl-body having at the bottom an opening for the discharge of water and air, substantially as set forth.

4. The combination, in an exhaust-cowl, of the diamond-shaped cowl-body having its long axis in a vertical plane and having openings at the sides of the body, with plates shielding said openings, said cowl-body having openings at the upper and lower sharp ends, and a deflecting-plate situated directly below the upper opening, substantially as and for the purpose set forth.

5. The combination, in an exhaust-cowl, of the vertical plates E, forming a hood diamond-shaped in cross-section and having exits in the front and rear sides, with the outer vertical plates D, shielding said exits and extending only to a point back of the points of the diamond cowl-body and inclined so as to form with the plates comprising said cowl-body opposite inclined discharge-passages, substantially as and for the purpose described.

In testimony whereof I have signed my name to this specification, in the presence of two subscribing witnesses.

RICHARD M. PANCOAST.

Witnesses:
HENRY HOWSON,
HARRY SMITH.